US008635127B1

(12) United States Patent  (10) Patent No.: US 8,635,127 B1
Shaw  (45) Date of Patent: Jan. 21, 2014

(54) SYSTEM AND METHOD FOR IDENTIFYING TAX DOCUMENTS TO CUSTOMIZE PREPARATION OF A TAX RETURN

(75) Inventor: Neal Shaw, Shawnee, KS (US)

(73) Assignee: HRB Innovations, Inc., Kansas City, MO (US)

( * ) Notice: Subject to any disclaimer, the term of this patent is extended or adjusted under 35 U.S.C. 154(b) by 686 days.

(21) Appl. No.: 12/210,557

(22) Filed: Sep. 15, 2008

Related U.S. Application Data

(60) Provisional application No. 60/972,552, filed on Sep. 14, 2007.

(51) Int. Cl.
*G06F 17/22* (2006.01)
*G07F 19/00* (2006.01)

(52) U.S. Cl.
USPC .......................................................... 705/31

(58) Field of Classification Search
USPC .......................................................... 705/31
See application file for complete search history.

(56) References Cited

U.S. PATENT DOCUMENTS

| | | | |
|---|---|---|---|
| 4,890,228 A | 12/1989 | Longfield | |
| 5,423,033 A | 6/1995 | Yuen | |
| 5,649,115 A | 7/1997 | Schrader et al. | |
| 5,724,523 A | 3/1998 | Longfield | |
| 5,842,185 A | 11/1998 | Chancey et al. | |
| 5,903,881 A | 5/1999 | Schrader et al. | |
| 6,032,137 A | 2/2000 | Ballard | |
| 6,202,052 B1 | 3/2001 | Miller | |
| 6,314,415 B1 | 11/2001 | Mukherjee | |
| 6,360,208 B1 | 3/2002 | Ohanian et al. | |
| 6,400,845 B1 | 6/2002 | Volino | |
| 6,411,938 B1 | 6/2002 | Gates et al. | |
| 6,446,048 B1 | 9/2002 | Wells et al. | |
| 6,473,741 B1 | 10/2002 | Baker | |
| 6,567,789 B1 | 5/2003 | Baker | |
| 6,589,290 B1 | 7/2003 | Maxwell et al. | |
| 6,611,809 B1 | 8/2003 | McCalden | |
| 6,687,681 B1 | 2/2004 | Schulz | |
| 7,454,371 B2 | 11/2008 | Wyle et al. | |
| 7,539,635 B1* | 5/2009 | Peak et al. | 705/31 |
| 2002/0013747 A1* | 1/2002 | Valentine et al. | 705/31 |
| 2002/0091602 A1 | 7/2002 | Stern et al. | |

(Continued)

OTHER PUBLICATIONS

TurboTax, Inuit Press Release, details regarding Keen-Intuit Alliance to deliver live accounting advice 2 pages, Oct. 9, 2001.

(Continued)

*Primary Examiner* — Seye Iwarere
(74) *Attorney, Agent, or Firm* — Erise IP, P.A.

(57) ABSTRACT

A computerized system and method for identifying tax documents to customize tax return preparation. Tax preparation software allows users to identify the tax documents relevant to a taxpayer's situation so that an appropriate tax return can be prepared. The software displays graphical representations of tax documents and allows the user to select the tax documents applicable to the taxpayer's situation by dragging and dropping them on a designated area on the computer display. Once the user has selected the appropriate tax documents, the software prompts the user for responses to data prompts that are appropriate for the taxpayer's situation according to the selected tax documents. The data prompts that are presented relate to the tax documents identified by the user and therefore, are relevant to the taxpayer's specific situation. Prompts for tax data that are not appropriate for the taxpayer's situation are not asked.

6 Claims, 1 Drawing Sheet

(56) References Cited

U.S. PATENT DOCUMENTS

| | | |
|---|---|---|
| 2002/0111888 A1* | 8/2002 | Stanley et al. .................. 705/31 |
| 2002/0133410 A1 | 9/2002 | Hermreck et al. |
| 2003/0004795 A1 | 1/2003 | Monrad |
| 2003/0036912 A1 | 2/2003 | Sobotta et al. |
| 2003/0101114 A1 | 5/2003 | Delapass et al. |
| 2003/0188262 A1 | 10/2003 | Maxwell et al. |
| 2004/0078271 A1 | 4/2004 | Morano et al. |
| 2004/0078307 A1 | 4/2004 | Carver |
| 2004/0083145 A1 | 4/2004 | Kobayashi et al. |
| 2004/0088233 A1 | 5/2004 | Brady et al. |
| 2004/0181749 A1 | 9/2004 | Chellapilla et al. |
| 2004/0225581 A1 | 11/2004 | Wyle et al. |
| 2005/0038722 A1 | 2/2005 | Throndson et al. |
| 2006/0112114 A1* | 5/2006 | Yu et al. ......................... 707/100 |
| 2006/0155632 A1 | 7/2006 | Cherkas et al. |
| 2007/0033116 A1* | 2/2007 | Murray ........................... 705/31 |
| 2008/0059900 A1* | 3/2008 | Murray et al. ................. 715/777 |

OTHER PUBLICATIONS

Simi Valley computer User's Group, Description Turbo Tax, 14 pages, pp. 1-4 Feb. 2002.

* cited by examiner

SYSTEM AND METHOD FOR IDENTIFYING TAX DOCUMENTS TO CUSTOMIZE PREPARATION OF A TAX RETURN

CROSS-REFERENCE TO RELATED APPLICATION

This application claims the benefit of U.S. Provisional Patent Application No. 60/972,552, filed Sep. 14, 2007 and titled System and Method for Identifying Tax Documents to Customize Preparation of a Tax Return.

FIELD OF THE INVENTION

The present invention relates generally to systems and methods for preparing tax returns. In particular, the present invention relates to a computerized system and method for identifying tax documents to customize preparation of a tax return.

BACKGROUND OF THE INVENTION

Tax preparation software today typically obtains tax data for completing a tax return by conducting a screening interview and questioning a taxpayer or other user of the software about the type of tax data relevant to the taxpayer's situation. Standard screening questions may relate to the taxpayer's income, deductions, credits, etc. The responses to the standard screening questions allow the software to determine what specific data will be needed for completion the tax return and therefore, what additional data prompts are necessary to complete the tax data gathering process. Each response to a screening question regarding the type of tax data the taxpayer has determines the subsequent data prompts that are posed to the user so that the appropriate tax data is collected for preparation of the tax return.

There are disadvantages to using a standard screening interview in tax preparation software. The user may be required to answer many questions about what tax data the taxpayer has or does not have so that additional data prompts related to the actual amounts are propagated. In many instances, the software poses screening questions that are not appropriate for the taxpayer's situation but are nonetheless required for the software to determine which subsequent data prompts to present. For example, the user may be asked whether the taxpayer has miscellaneous income from a Form 1099-MISC or real estate proceeds from a Form 1099-S. Many taxpayers do not have such income or proceeds. However, in order to prepare an appropriate tax return, the tax preparation software must confirm that the taxpayer does not have such income to report.

The process of providing tax data for do-it-yourself tax software or other tax preparation software is cumbersome because users are required to complete a lengthy screening interview that often requires the user to confirm that the taxpayer does or does not have certain tax data or that certain tax situations do or do not apply to the taxpayer. The tax return cannot be prepared unless the tax data appropriate for the taxpayer's specific situation is collected and communicated to the software. Because screening questions are used to determine what data to collect, the only way to ensure that the appropriate data is actually collected is to question the user on every possible source of income, deduction, credit, etc. for the taxpayer. Through the use of screening questions, the tax software is able to determine what information and data is appropriate for the taxpayer's situation. However, the screening process is time consuming and is especially ineffective for taxpayers that have only a few sources of income and a few applicable deductions or credits. Therefore, there is a need for a tax preparation system and method that reduces the number of screening questions that a user must answer and that results in a customized tax preparation process according to taxpayer's situation.

SUMMARY OF THE INVENTION

The present invention is a new interface to tax preparation software that allows a user to identify the tax documents a taxpayer has so that an appropriate tax return can be prepared. Tax preparation is customized according to the tax documents that are identified at the beginning of the process. In an example embodiment of the present invention, the software displays for the user a plurality of tax forms or documents and allows the user to select the tax forms or documents that apply to the taxpayer's tax situation by dragging and dropping them on a designated area on the computer display. Once the user has selected the tax forms or documents that are appropriate for the taxpayer's situation, the tax return preparation proceeds as the software prompts the user for data or input that is appropriate for the taxpayer's situation according to the tax forms or documents selected. The subsequent data prompts that are presented relate to the tax forms or documents identified by the user and therefore, are relevant to the taxpayer's specific situation. Data prompts that are not appropriate for the taxpayer's situation may not need to be presented.

The user interface of the present invention is easy to understand and allows the software to determine quickly which tax data is relevant and therefore, which additional data prompts should be posed to the user. It reduces the need to use screening questions to determine which data prompts are needed. To select relevant documents, the user responds to visual prompts in the form of sample tax forms or documents and can indicate quickly and easily which tax forms or documents are relevant to the taxpayer's situation. For example, rather than responding to 10 standard screening questions in which the user is asked whether the taxpayer has certain tax data, the user may select four tax forms and drag them to a specified destination on the computer display. The selected tax forms indicate to the software which subsequent data prompts are appropriate for the taxpayer's situation. The tax return preparation process is customized according to the identified tax forms so that the level of user interaction is reduced dramatically from prior art methods. As a result, less time and effort are required to complete the tax return and a user is not required to respond to many screening questions.

DESCRIPTION OF EXAMPLE EMBODIMENTS

Figure 1:
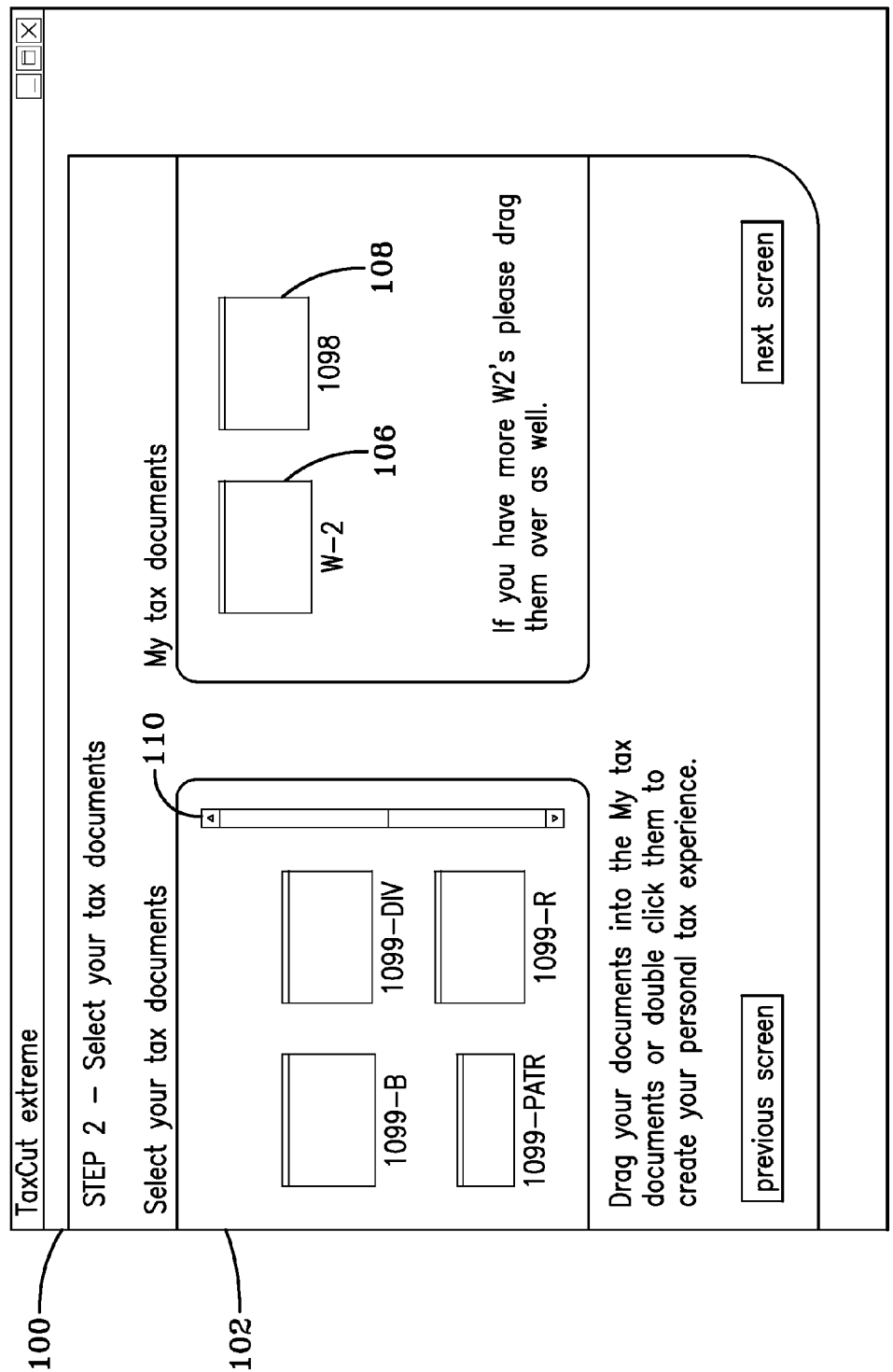
FIG. 1 is a sample screen for tax document selection according to an example embodiment of the present invention.

The present invention is a new interface to tax preparation software that allows user to identify the tax documents relevant to a subject taxpayer's situation so that an appropriate tax return can be prepared. The user of the software may be the taxpayer or an individual using the software on behalf of a taxpayer who may be a spouse, a relative, a friend, etc. In all cases, the user enters information and data relevant to the taxpayer for whom the return is to be prepared and filed.

The tax return preparation process is customized for each taxpayer's situation based on the tax documents that the taxpayer has and that have been identified to the tax preparation software by a user. In the beginning, the preparation process may the same for all users. Each user answers questions related to the taxpayer's personal information such as name, address, date of birth, etc. If information and data for the taxpayer has been entered in the software previously, the taxpayer's personal information may be retrieved from another source such as a tax return from a prior year, a local database, or possibly an online database.

Once the taxpayer's personal information is obtained, a screen comprising various tax forms or documents is presented to the user. In an example embodiment of the present invention, visual or graphical representations of the tax documents are presented so that the user can visually compare them to the taxpayer's actual tax documents to determine which ones are relevant to the tax situation. The taxpayer may have (or provide to the user) paper copies of his or her personal tax documents or electronic copies. In either case, the user can make the visual comparisons with the visual or graphical representations of the tax documents on the screen to select the appropriate documents.

Referring to FIG. 1, a sample screen of tax documents for taxpayer selection according to an example embodiment of the present invention is shown. As indicated in FIG. 1, the screen is divided into two sections. Example tax documents from which the user may choose are presented in a left portion of the screen in a section labeled "Select your tax documents" 102. Using a drag and drop operation, the example tax documents relevant to the taxpayer's tax situation may be selected and moved to a section in a right portion of the screen labeled "My tax documents" 104. In the present example for filing a tax return with the U.S. Internal Revenue Service, the types of documents from which the user may select include Form W-2 Wage and Tax Statement, Form 1098 Mortgage Interest Statement, Form 1099-B Proceeds from Broker and Barter Exchange Transactions, Form 1099-DIV Dividends and Distributions, Form 1099-PATR Taxable Distributions Received from Cooperatives, and Form 1099-R Distributions from Pensions, Annuities, Retirement, or Profit-Sharing Plans, IRAs, Insurance Contract, etc. Only certain tax documents may be applicable to a taxpayer's situation. For example, as shown in FIG. 1, the relevant tax documents may include only a Form W-2 Wage and Tax Statement 106 and a Form 1098 Mortgage Interest Statement 108.

Although the example of FIG. 1 shows six possible tax documents, there are many tax documents that could apply to a taxpayer's tax situation. Table 1 identifies sample U.S. Internal Revenue Service tax documents that could apply to a taxpayer's tax situation and that could be selected from the "Select your tax documents" section 102 of the screen in FIG. 1. The portion of the screen in which the tax documents are presented may comprise a scroll bar 110 for browsing the possible selections that are not visible.

TABLE 1

| U.S. IRS Form | Description |
| --- | --- |
| W-2 | Wage and Tax Statement |
| W-2G | Certain Gambling Winnings |
| 1042-S | Foreign Person's U.S. Source Income Subject to Withholding |
| 1098 | Mortgage Interest Statement |
| 1098-E | Student Loan Interest |
| 1098-T | Tuition Statement |
| 1099-A | Acquisition or Abandonment of Secured Property |
| 1099-B | Proceeds from Broker and Barter Exchange Transactions |

TABLE 1-continued

| U.S. IRS Form | Description |
| --- | --- |
| 1099-CAP | Changes in Corporate Control and Capital Structure |
| 1099-C | Cancellation of Debt |
| 1099-INT | Interest Income |
| 1099-DIV | Dividends and Distributions |
| 1099-G | Certain Government Payments |
| 1099-H | Health Coverage Tax Credit (HCTC) Advance Payments |
| 1099-LTC | Long-Term Care and Accelerated Death Benefits |
| 1099-MISC | Miscellaneous Income |
| 1099-OID | Original Issue Discount |
| 1099-PATR | Taxable Distributions Received from Cooperatives |
| 1099-Q | Payments From Qualified Education Programs (Under Sections 529 and 530) |
| 1099-R | Distributions from Pensions, Annuities, Retirement, or Profit-Sharing Plans, IRAs, Insurance Contract, etc. |
| 1099-S | Proceeds from Real Estate Transactions |
| 1099-SA | Distributions From an HSA, Archer MSA, or Medicare Advantage MSA |
| 5498 | IRA Contribution Information |
| 5498-ESA | Coverdell ESA Contribution Information |
| 5498-SA | HSA, Archer MSA, or Medicare Advantage MSA Information |

Tax documents for filing state and local tax returns may also be included in the list of documents from which a taxpayer may choose.

The user's selection of relevant tax documents is then used to configure the remainder of the preparation process. The preparation process is customized to the taxpayer's personal tax situation based on the tax documents that were selected. Data prompts for tax data that are relevant to the selected tax documents are then presented to the user. The user responds to the data prompts and the tax software prepares a return based on the information provided according to the customized process.

Data prompts that are not relevant to the taxpayer's situation may not presented to the user. As the form list in Table 1 indicates, there are many forms used to report tax information to taxpayers and to the U.S. Internal Revenue Service and other tax authorities. Many of these forms may not be applicable to a taxpayer's tax situation. If the user does not select certain tax documents, the tax preparation software assumes there is no tax data to obtain and report that is relevant to the unselected tax documents. The user is not presented with data prompts for unselected tax documents. In fact, there is no need to confirm with the user that certain tax information is not applicable to the subject taxpayer's situation.

Two examples illustrate the way in which the return preparation process may be customized according to selected tax documents.

In a first example, if a user selects more than one Form W-2 for, a data prompt for information for each Form W-2 is presented. In a second example, if a user selects a Form 1099-R, then data prompts related to 1099-INT are not presented.

It is understood that tax preparation software used by an individual to prepare his or her own tax return or to prepare a tax return for another individual such as a spouse, relative, or friend could be adapted to provide the features and functionality of the present invention. Any type of tax preparation software for use by a taxpayer or an individual on behalf of a taxpayer may be modified to provide a customized return preparation process according to the tax documents that have been identified as relevant to a taxpayer's situation.

While example embodiments of the invention have been illustrated and described, various modifications and combinations can be made without departing from the spirit and scope of the invention. For example, the types of tax documents presented to a computer may be varied according the requirements of the relevant tax authority. Furthermore, the presentation of tax documents to a computer user and their selection may be modified in many ways and fall within the scope of the present invention. Modifications, combinations, and equivalents to the system and method of the present invention are intended to be covered and claimed.

What is claimed is:

1. A computerized method for identifying tax documents to customize a taxpayer interview in a tax preparation program comprising:

presenting to a computer user on a computer screen from said tax preparation program images of a plurality of sample tax documents corresponding to said taxpayer's actual tax documents comprising reported tax data;

determining in said tax preparation program said computer user's selection of at least one of said plurality of sample tax documents relevant to said taxpayer's tax situation;

in response to said computer user's selection of said at least one sample tax document, customizing a tax preparation interview process according to said at least one sample tax document wherein said tax preparation program:

(1) presents at least one data prompt to said computer user for entering tax data, said data prompt selected for said computer user according to said at least one of said plurality of tax documents selected by said computer user;

(2) receives said computer user's response to said at least one data prompt for entering tax data; and in response to receiving said computer user's response, prepares a tax return using said tax preparation program and said response to said at least one data prompt for entering tax data.

2. The method of claim 1 wherein determining said computer user's selection of at least one of said plurality of sample tax documents comprises determining which of said plurality of sample tax documents said computer user has dragged and dropped in a section of said computer screen.

3. The method of claim 1 wherein presenting on a computer screen a plurality of sample tax documents comprises displaying images with textual descriptions of said plurality of tax documents.

4. The method of claim 3 wherein determining said computer user's selection of at least one of said plurality of sample tax documents comprises determining which of said plurality of sample tax documents said computer user has selected from said images with said textual descriptions of said plurality of sample tax documents.

5. The method of claim 1 wherein said computer user is said taxpayer.

6. The method of claim 1 wherein said computer user is a tax professional preparing said tax return for said taxpayer.

* * * * *